United States Patent [19]

Dornbush et al.

[11] Patent Number: 5,520,096
[45] Date of Patent: May 28, 1996

[54] COOKING SYSTEM AND ACCESSORIES

[75] Inventors: David A. Dornbush, Prior Lake; Chad S. Erickson, Plymouth; Steven Alseth, Cologne; N. Philip Sked, Bloomington, all of Minn.; Robert T. Lee, Clinton; Theodore H. Rehmeyer, Winston-Salem, both of N.C.

[73] Assignee: American Harvest, Inc., Chaska, Minn.

[21] Appl. No.: 397,948

[22] Filed: Mar. 3, 1995

Related U.S. Application Data

[62] Division of Ser. No. 2,213, Jan. 8, 1993, Pat. No. 5,416,950.

[51] Int. Cl.$^6$ .......................... A47J 27/00; A47J 37/00; A47J 45/10; A21B 1/52
[52] U.S. Cl. .................. 99/340; 99/330; 99/476; 126/21 A; 126/275 E; 219/400
[58] Field of Search .................... 99/330, 340, 476, 99/448, 450, 393, 473–475; 219/400, 401, 391, 392, 386; 126/21 A, 275 E, 275 R; 16/114 R, 114 A; 220/254, 756–759, 768

[56] References Cited

U.S. PATENT DOCUMENTS

| | | |
|---|---|---|
| D. 35,040 | 9/1901 | Handy . |
| D. 58,205 | 6/1921 | Andrews, Jr. . |
| 73,703 | 1/1868 | Elder . |
| D. 176,971 | 2/1956 | Belnert . |
| D. 215,650 | 4/1979 | Heller . |
| D. 215,907 | 4/1989 | Little . |
| D. 309,397 | 7/1990 | Strand . |
| D. 309,692 | 8/1990 | Strand . |
| D. 321,109 | 10/1991 | Erickson et al. . |
| D. 321,110 | 10/1991 | Worrell et al. . |
| 323,887 | 8/1885 | Rutter . |
| D. 328, 687 | 8/1992 | Dornbush et al. . |
| 503,756 | 8/1893 | Uniack . |
| 941,041 | 11/1909 | Phillips ........................ 220/254 |
| 972,078 | 10/1910 | Harrison . |
| 1,056,237 | 3/1913 | Waller . |
| 1,997,509 | 4/1935 | Betteridge et al. ........................ 220/254 |
| 2,118,326 | 5/1938 | Richardson, Jr. . |
| 2,402,883 | 6/1946 | Gavalis . |
| 2,914,185 | 11/1959 | LeVay . |
| 3,349,948 | 10/1967 | Hughes . |
| 3,383,083 | 5/1968 | Givens et al. . |
| 3,399,858 | 9/1968 | Luker . |
| 3,577,908 | 5/1971 | Burg . |
| 3,610,135 | 10/1971 | Sheridan . |
| 3,905,535 | 9/1975 | Gordon . |
| 4,176,591 | 12/1979 | Power . |
| 4,185,125 | 1/1980 | Sakakibara et al. . |

(List continued on next page.)

FOREIGN PATENT DOCUMENTS

| | | |
|---|---|---|
| 537402 | 4/1955 | Belgium . |
| 993517 | 11/1951 | France . |
| 1078213 | 5/1954 | France . |
| 2573643 | 5/1986 | France . |
| 2577785 | 8/1986 | France . |
| 503054 | 7/1930 | Germany . |
| 118622 | 1/1970 | Norway . |
| 314594 | 8/1956 | Switzerland . |
| 262285 | 12/1926 | United Kingdom . |
| 519884 | 4/1940 | United Kingdom . |
| 661454 | 11/1951 | United Kingdom . |

Primary Examiner—Timothy F. Simone
Attorney, Agent, or Firm—Merchant, Gould, Smith, Edell, Welter & Schmidt

[57] ABSTRACT

A handle adapted for replacing a heater and blower system removably located in a central opening defined a top enclosure of a countertop oven. The handle comprises a mounting system for removably attaching the handle to the top enclosure in order to replace the heater and blower system when the heater and blower system is removed. The handle enables a user to remove the top enclosure from the bottom enclosure by lifting up on the handle when the handle is installed in the top enclosure. In this manner, the countertop oven may be converted to a food server comprising the handle, the top enclosure, and the bottom enclosure.

21 Claims, 9 Drawing Sheets

U.S. PATENT DOCUMENTS

| | | | |
|---|---|---|---|
| 4,201,312 | 5/1980 | Basile . | |
| 4,296,682 | 10/1981 | Thompson . | |
| 4,329,977 | 5/1982 | Orter . | |
| 4,360,123 | 11/1982 | Blease | 220/323 |
| 4,378,729 | 4/1983 | Pierick | 99/400 |
| 4,384,513 | 5/1983 | Pierick . | |
| 4,554,864 | 11/1985 | Smith et al. . | |
| 4,563,946 | 1/1986 | Barlow et al. | 99/450 |
| 4,583,955 | 4/1986 | Toloczko | 99/426 |
| 4,649,053 | 3/1987 | Lamonica | 426/302 |
| 4,817,509 | 4/1989 | Erickson | 99/330 |
| 4,847,461 | 7/1989 | Gilmore | 99/449 |
| 5,056,424 | 10/1991 | Lai | 99/339 |
| 5,165,328 | 1/1992 | Erickson et al. . | |
| 5,165,424 | 11/1992 | Erickson et al. | 99/339 |
| 5,329,191 | 7/1994 | Chang . | |
| 5,329,919 | 7/1994 | Chang | 126/275 E |

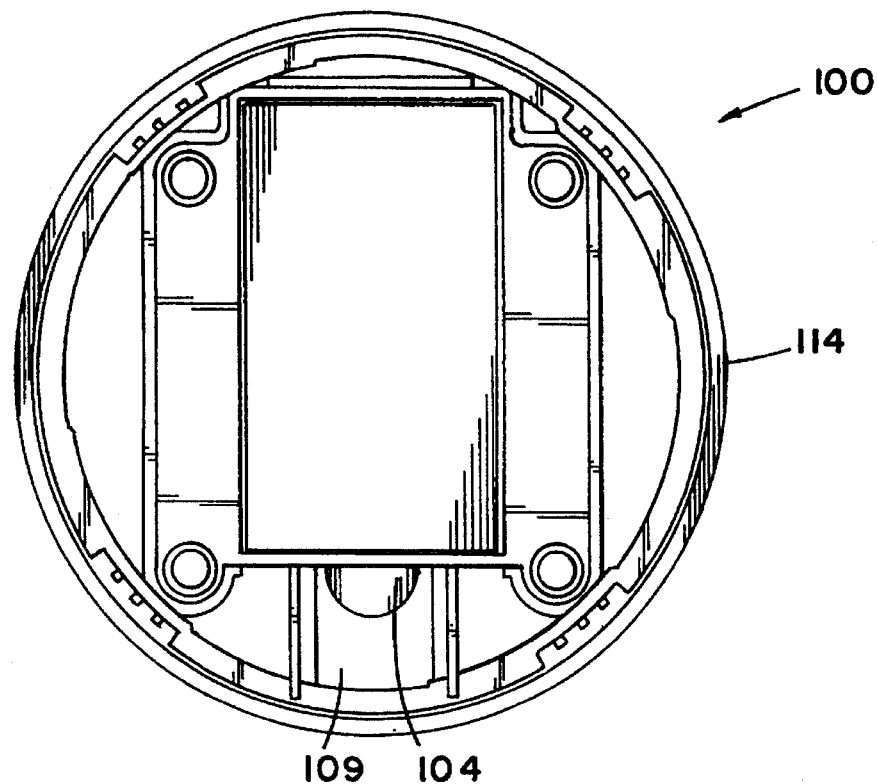
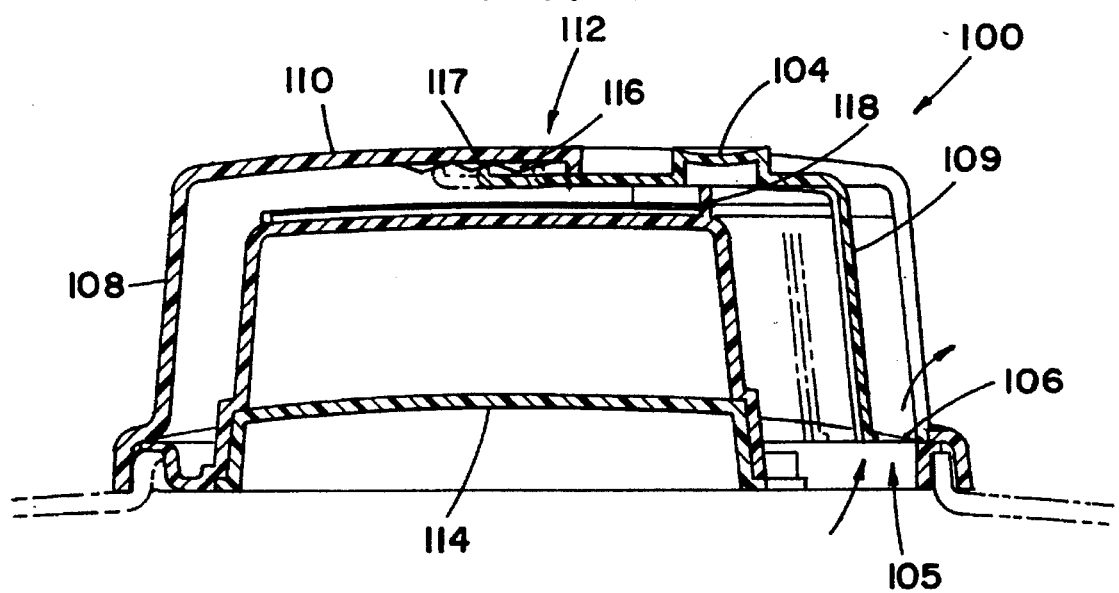

5,520,096

COOKING SYSTEM AND ACCESSORIES

This is a Divisional of application Ser. No. 08/002,213, filed Jan. 8, 1993, now U.S. Pat. No. 5,416,950, which application is incorporated herein by reference.

SUMMARY AND BACKGROUND OF THE INVENTION

The present invention relates to a handle for a system, a system and methods for cooking of food products.

The present handle invention comprises a handle adapted for replacing a heater and blower system removably located in a central opening defined a top enclosure of a countertop oven. The handle comprises a mounting system for removably attaching the handle to the top enclosure in order to replace the heater and blower system when the heater and blower system is removed. The handle enables a user to remove the top enclosure from the bottom enclosure by lifting up on the handle when the handle is installed in the top enclosure. In this manner, the countertop oven may be converted to a food server comprising the handle, the top enclosure, and the bottom enclosure.

The present cooking pan invention comprises a pan having a generally flat, round bottom member, the bottom member defining a central opening. The pan further comprises an outer peripheral wall extending upwardly and being located at the outer diameter of the bottom member, the outer peripheral wall having a height of approximately one-half inch. In addition, the pan comprises an inner peripheral wall extending upwardly and being located at the periphery of the central opening, the inner peripheral wall having a height of approximately one-eight inch.

The present cooking pan system invention comprises a system for cooking food in an air oven. The system comprises a plurality of spaced cup units having side walls defining a generally cylindrical configuration which smoothly transition into a bottom member with a substantially rounded connection between the side walls and the bottom member. The system also comprises a thin, relatively flat wire frame for holding the cup units in position, the wire frame comprising outer and inner annulus members, wherein the circumference of the outer and inner annulus members are determined by a diametrical dimension defined by the generally cylindrical configuration of each cup unit, and wherein the annulus members engage the cup side walls in order to secure the cup units in a system configuration permitting the flow of heated air between the cup units.

A method invention of cooking foods in an air oven comprises using a cooking pan having a hole in its center, wherein the air oven cooks food by circulating heated air throughout the air oven cooking chamber, wherein the circulating air is drawn back up into the center of the cooking chamber and reheated and directed back down to be circulated around food positioned on the cooking pan disposed in the air oven, and wherein the hole in the cooking pan creates a passage for the circulation of the heated air.

An alternate method invention of cooking food in an air oven having a cooking chamber comprises positioning on a rack in the cooking chamber a food cooking system. The food cooking system placed on the rack comprises a frame and cup units positioned in the frame. In the method, the air oven cooks the food by circulating blower-driven heated air throughout the air oven cooking chamber. The circulating air is drawn back up into the center of the cooking chamber and reheated and directed back down to be circulated around the cup units. The frame cup units are spaced apart in order to allow the heated air to flow throughout the cooking chamber and between the cups back up into the top of the cooking chamber.

IN THE DRAWINGS

FIG. 3 is a bottom view of the steam and heat controllable handle;

FIG. 4 is a view taken along lines 4—4 in FIG. 2;

DETAILED DESCRIPTION OF THE INVENTION

Figure 1:
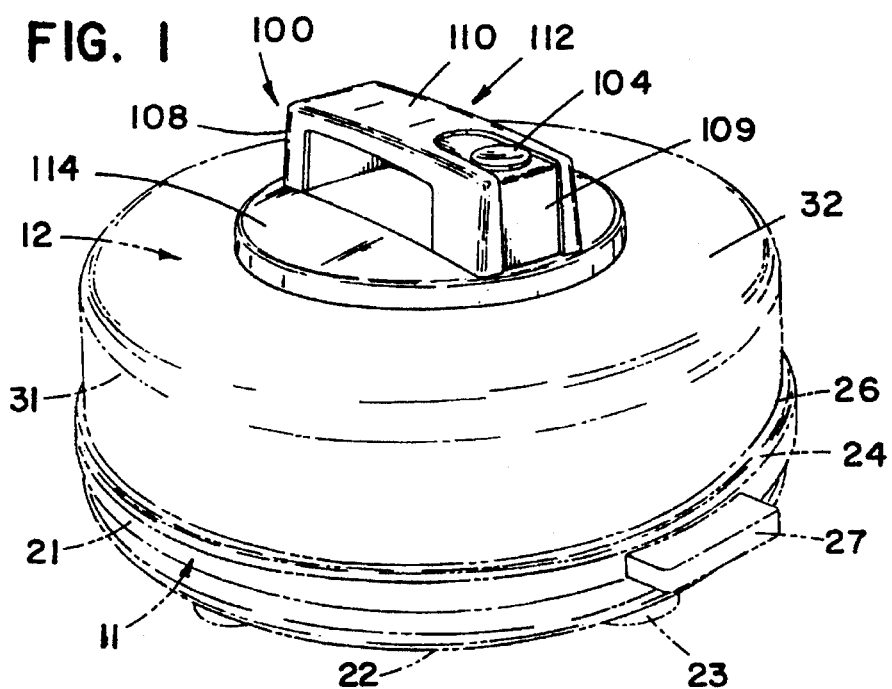
FIG. 1 is a perspective view of the cooking device for use in the present invention having a steam and heat controllable handle engaged.

The present application incorporating by reference the disclosure of U.S. Pat. Nos. 4,817,509 and 5,165,328 are if fully set forth herein. A cooking device 10 of as illustrated in FIGS. 5, 12, 16, and 19, includes a base member 11, a top 12 and a powered heater unit 13. The heater unit 13 is in locked engagement with top 12 as hereinafter described. The cooking device 10 further includes a lower frame bracket 14 and an upper frame bracket 15 which are hingedly engaged such as by removable pin 17. The brackets 14 and 15 may be integrally secured to the base 11 and top 12 respectively, or alternatively, they may be removably secured such as by snap mechanism 18.

Figure 2:
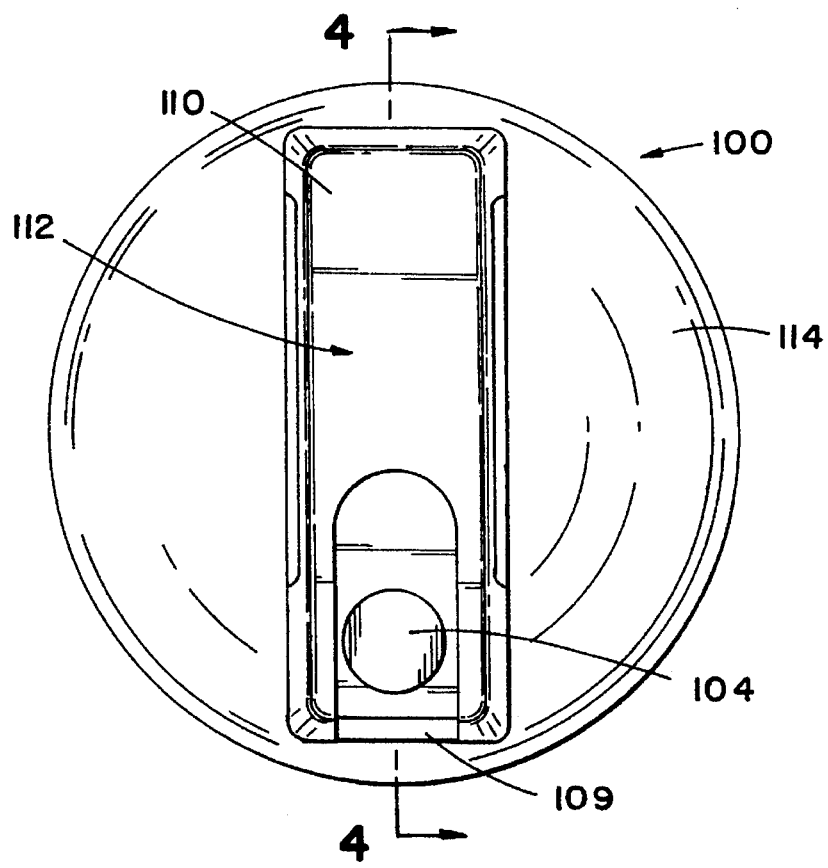
FIG. 2 is a top view of the steam and heat controllable handle.
Figure 5:
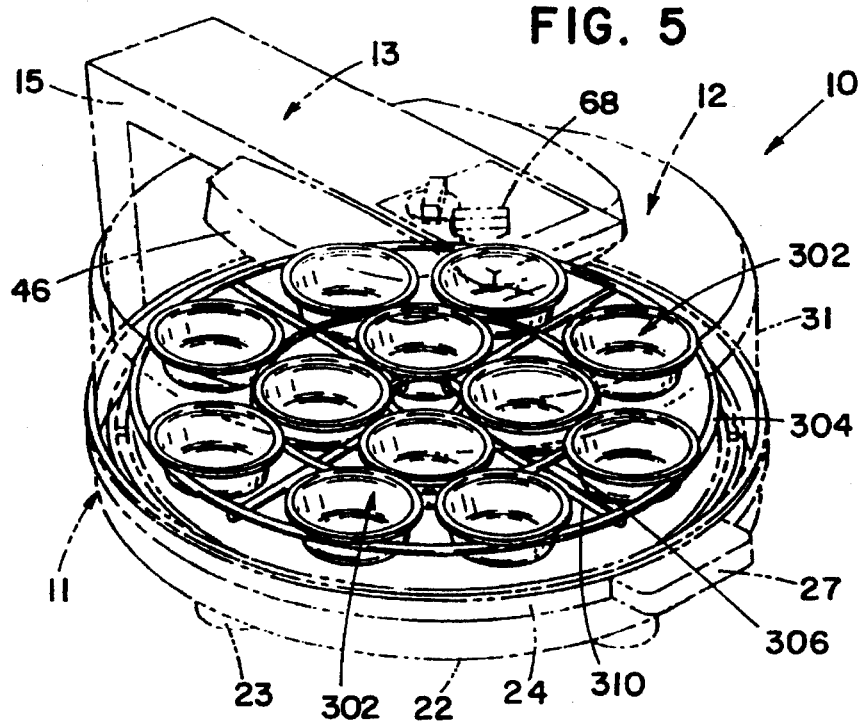
FIG. 5 is a perspective view of a 12-cup unit muffin cooking system.

The base 11 may be suitably formed of a polymeric material that may be transparent and includes a circumferential wall 21, an integral lower wall 22 and a plurality of feet 23. The feet 23 serve to elevate the lower wall 22 upwardly from a support surface such as a countertop. The lower unit 11 may include a thickened upper rim 24 defining a slot 26 into which the top 12 may be lodged. The base 11 may further include a handle 27. The circumferential wall 21 further includes an annular rim which serves to support the rack 29 on which the food pieces may be disposed. The rack 29 may be of a conventional wire construction as illustrated in FIGS. 1 and 2.

The top 12 of the cooking unit 10 likewise includes a circumferential wall 31 and an upper wall 32. The wall 32 may be integral with wall 31; for example, produced by injection molding, or alternatively, vacuum molding. The upper wall 32 has an opening 32' defined therein for receipt of the powered heating unit 13.

The power heater unit 13 is illustrated in FIGS. 5, 12, 16, and 19. The power unit 13 includes a motor portion 41, a heater and a blower blade 43. The motor portion 41 includes an inner housing which may be of sheet metal, an outer housing 46 which may be injection molded plastic and a motor, including an armature and a rotatably driven shaft which extends outwardly from each side of the armature.

The heater may be an open coil, resistance wire type, and may be thermostatically regulated to maintain cooking temperatures ranging from 150 to 450+ degrees F.

The open heater coil is used in order to achieve the lowest possible surface watt density. With adequate air flow, such an element is capable of transferring maximum heat to the air stream via conduction, while operating in the "black" heat range. In order for other types of heating elements, such as tubular types, to give off the same wattage given the same space and airflow, the heater would glow. Such a high surface watt density would result in overheating of the motor blower, the food being cooked and plastic parts through an excessive radiation of heat. In addition, such an element would retain too much heat when the unit is shut off, causing additional overtemperature problems.

The heater assembly also incorporates an overtemperature device capable of shutting off power to the heater should the thermostat fail.

The blade 43 creates two air circulations. The first air circulation is throughout the heated chamber. The second air circulation passes a small portion of air over the heated coils in the heater. In other words, the small air current exits radially outwardly from the blade 43, reverses direction 180 degrees to be drawn in over the coil, then radially inwardly to the center of the heater, then downwardly into the center zone of the blade 43. A protective grid is provided over the blade 43.

Electrical current is fed into the device 10 by way of electric cord 67. The cord 67 may include a conventional plug for insertion into a wall socket. The electrical current passes through switch mechanism 68 mounted in the upper portion 15. The switch 68 includes a sensing mechanism to provide shutdown of the unit in the case of overheating in the heating chamber and/or motor housing 41. The switch mechanism 68 may also include sensing mechanism to shut down the unit if the top portion 12 is pivoted upwardly with the throw portion of the switch 68 in the "on" position.

Figure 19:
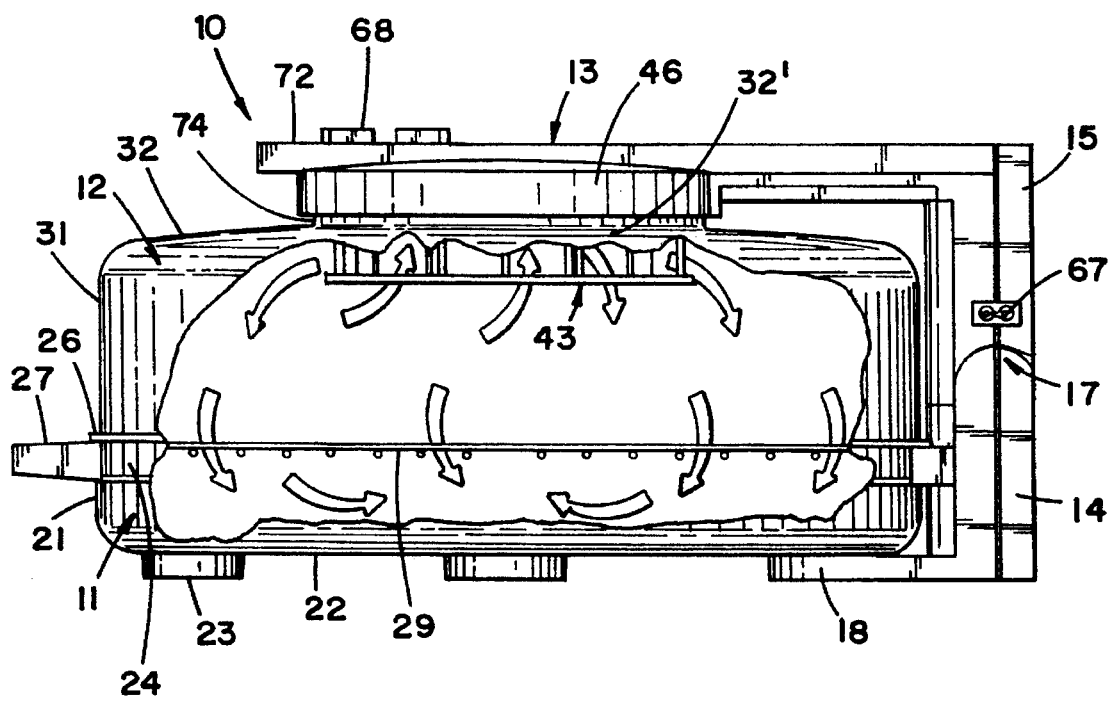
FIG. 19 is a sectional view of the upper and lower portions of a cooking device showing the electric motor fan and the cyclonic circulation of air.

The air fryer disclosed may be placed in operation by pivoting the top portion 12 upwardly. Food pieces such as potatoes, bakery goods, pizzas and the like may be placed on the rack 29. The top portion 12 is then pivoted downwardly to the position illustrated in FIGS. 5, 12, 16, and 19. The switch 68 is then activated turning the heating element and the motor on. With the blade 43 rotating, air is moved within the chamber formed by the lower unit portion 11 and the upper portion 12, as shown in FIG. 19. Air is circulated over the resistance coil thereby providing heat to such a chamber. The temperature will typically be in the range of 150–400 degrees F. If desired, a central wall may be mounted in the heated chamber to provide a disturbance and thus greater turbulence within the heated chamber.

Unlike conventional devices, the blower of the disclosed fryer is placed in the top center of the cooking chamber. The blower wheel is mounted in such a way as to project into the cooking chamber its upper surface being at the same level or lower than the upper wall of the chamber. In this position, the air thrown off the wheel travels parallel horizontally to the upper wall of the chamber until it is directed downward by the radius joining the upper wall and the vertical round side wall. The air then travels downward until it is again deflected at the base of the outside wall by the radius joining the side wall with the lower wall of the enclosure. The air is then simultaneously pushed and drawn by the blower across the top and beneath the cooking rack. As the air approaches the center of the enclosure, it is drawn up into the open underside of the blower wheel, where it is then recirculated through the same pattern described above.

The velocity of the air is not constant within the chamber, since the heated air converges as it moves to the center of the unit and is drawn into the blower. In the air fryer, the air cools as it contacts the food, but simultaneously accelerates as it converges on the center of the chamber. This change in velocity compensates for the dropping temperature by more effectively exchanging the heat remaining in the air. The result is very uniform cooking from the outer edge to the center of the cooking rack.

When cooking items that cover most of the cooking rack, such as pizza, or that require a pan, such as cookies, airflow to the underside of the rack is prevented from being drawn back into the blower wheel. The trapped air swirls rapidly, but cools off significantly, due to inadequate air exchange with the heated air mass above the rack. To compensate for the above, one or more "mixing vanes" may be located diagonally under the cooking rack. This causes the air to form two or more counter-rotating air masses that dramatically improve the air exchange under the rack.

Figure 17:
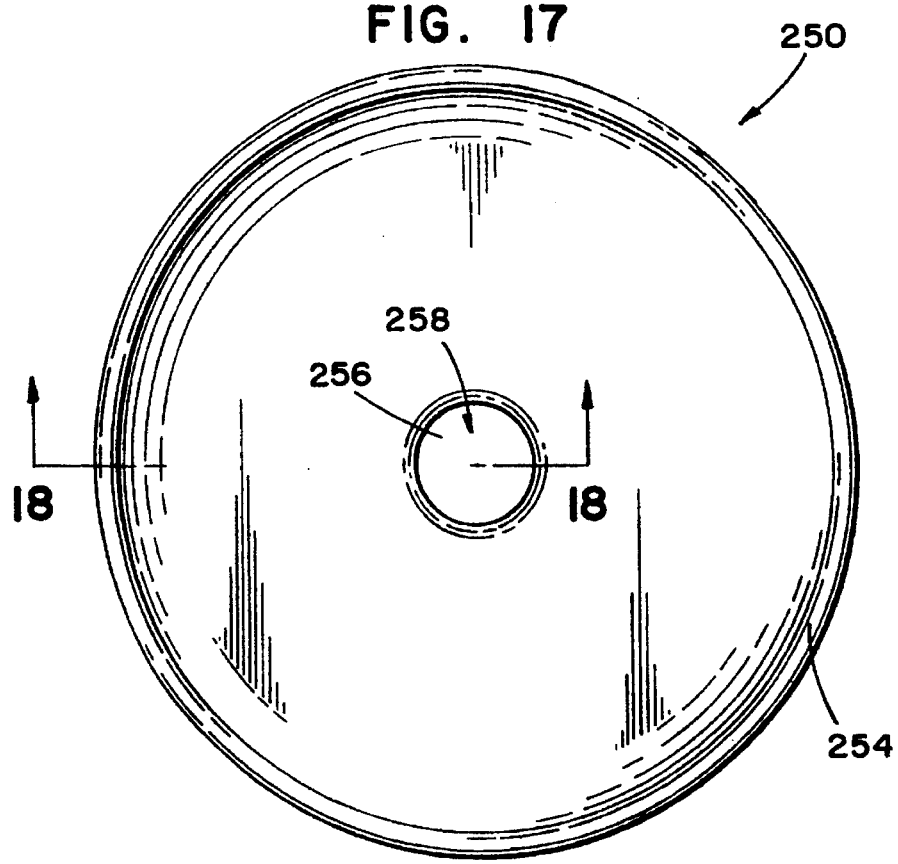
FIG. 17 is a top view of the cooking pan having a hole in its center.
Figure 18:
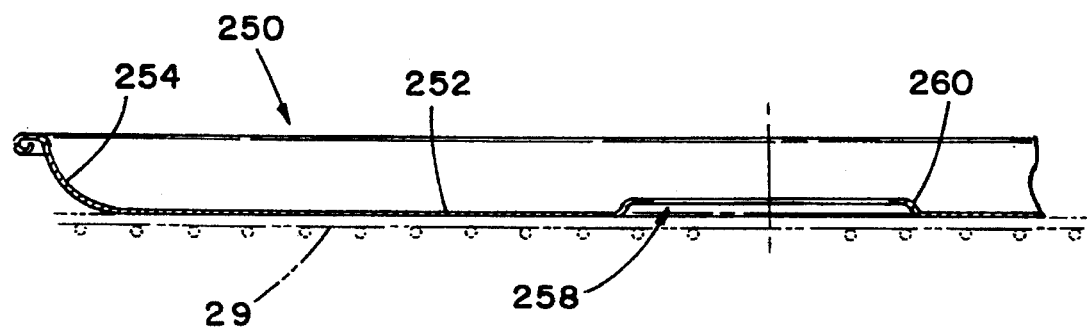
FIG. 18 is a view taken along lines 18—18 in FIG. 17.

Another method of solving the above mentioned problem associated with items that cover most of the rack, is to use a cooking pan 250 having a hole in the center of the pan as shown in FIG. 17. FIG. 17 shows a cooking pan 250 being a large radius flat-bottom surface 252 having a peripheral side wall 254 created by inclining the bottom of the flat surface 252 until a peripheral side wall 254 is formed. The flat bottom 252 and peripheral side wall 254 are a continuous surface and the peripheral side walls slope upwardly and outwardly from the center 256 of the flat-bottom surface 252. The flat-bottom surface 252 of the cooking pan 250 has a circular opening 258 at its center 256. The circular opening 258 has inner peripheral wall 260 sloping upwardly and inwardly.

The outer peripheral side wall 254 serves the function of a normal cooking pan. The circular opening 258 in the center 256 of the cooking pan 250 serves a purpose of allowing the cyclonic air to flow through the center of the cooking pan 250, thereby reducing the amount of air trapped beneath the cooking pan 250. This allows air to circulate more freely throughout the cooking chamber. The hole 258 in the center 256 of the cooking pan 250 in a preferred embodiment is approximately two (2) inches in diameter. However, other diameters may be more appropriate given the level of cyclonic air flow desired. The outside peripheral side walls 254 slope upwardly and outwardly for approximately ½ of an inch. The inner peripheral walls 260 slope upwardly and inwardly for approximately ⅛ of an inch. In addition, the cooking pan is made of a conductive material having a layer of non-stick surface attached thereon.

The hole 258 in the center of the cooking pan allows for increased flow of cyclonic air, by allowing air to be drawn back up into the blower wheel 43.

Figure 16:
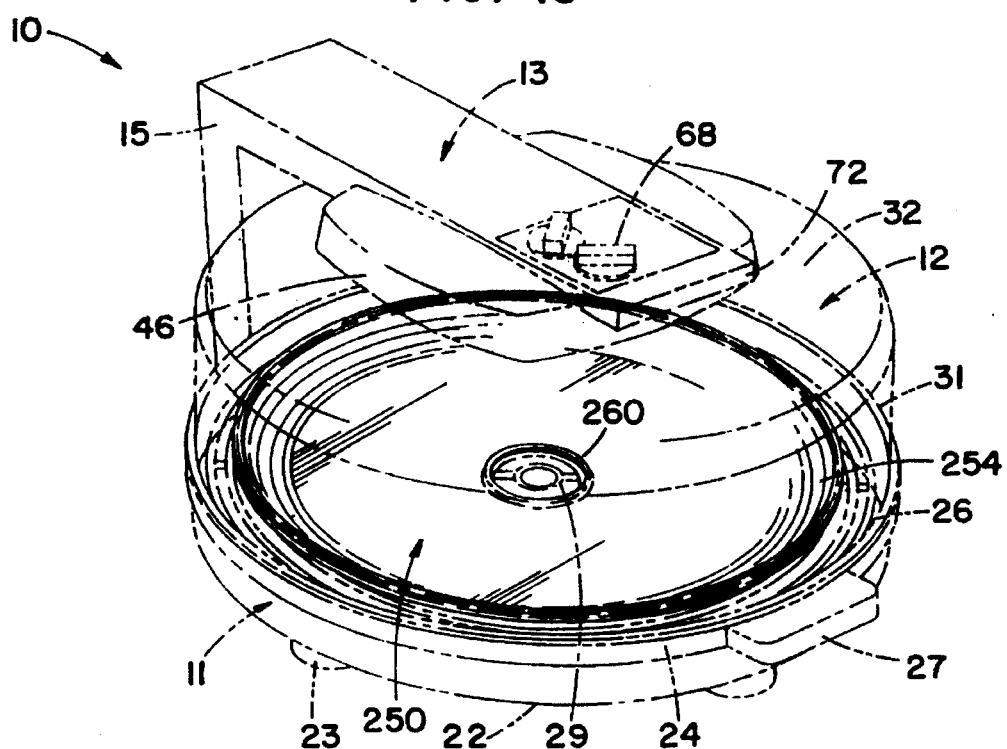
FIG. 16 is a prospective view of the cooking device showing its use of the cooking pan having a hole in at its center.

The cooking pan is placed directly on top of the rack of the cooking oven as shown in FIG. 16. This allows the cooking pan to keep some distance between its bottom surface and the bottom of the cooking chamber base. This distance is allows for a more complete circulation of air flow.

In addition to the cooking pan 250, another way to solve the problems associated with cooking items which cover most of the rack, such as muffin pans, the present invention discloses a muffin baking system 270.

The muffin baking system 270 involves a plurality of spaced cup units 272 positioned in a frame. The cup units 272 have a flat bottom surface 274 peripheral walls 276 and peripheral rims 278. The peripheral walls 276 are created by sloping the bottom surface 274 upwardly and outwardly. The bottom surface 274 and the peripheral wall 276 are one continuous surface. The peripheral rim 278 is created by tightly rolling the edge of the peripheral wall 278.

Figure 13:
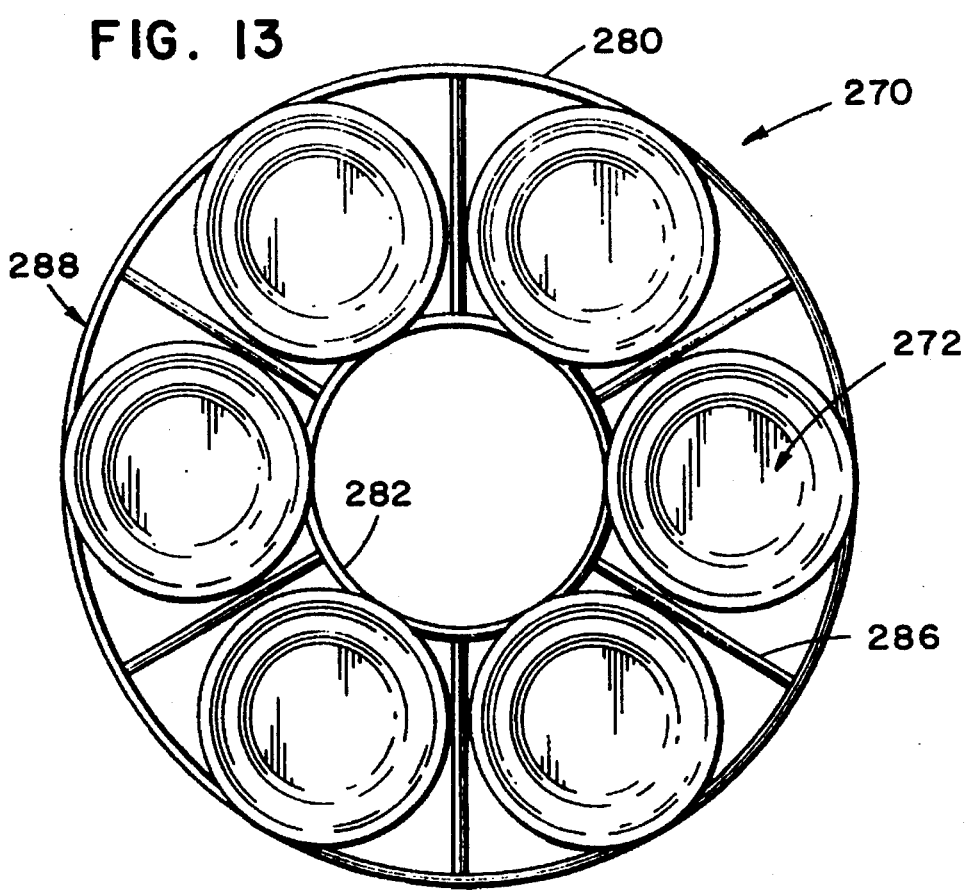
FIG. 13 is a top view of the 6-cup unit muffin cooking system.
Figure 14:
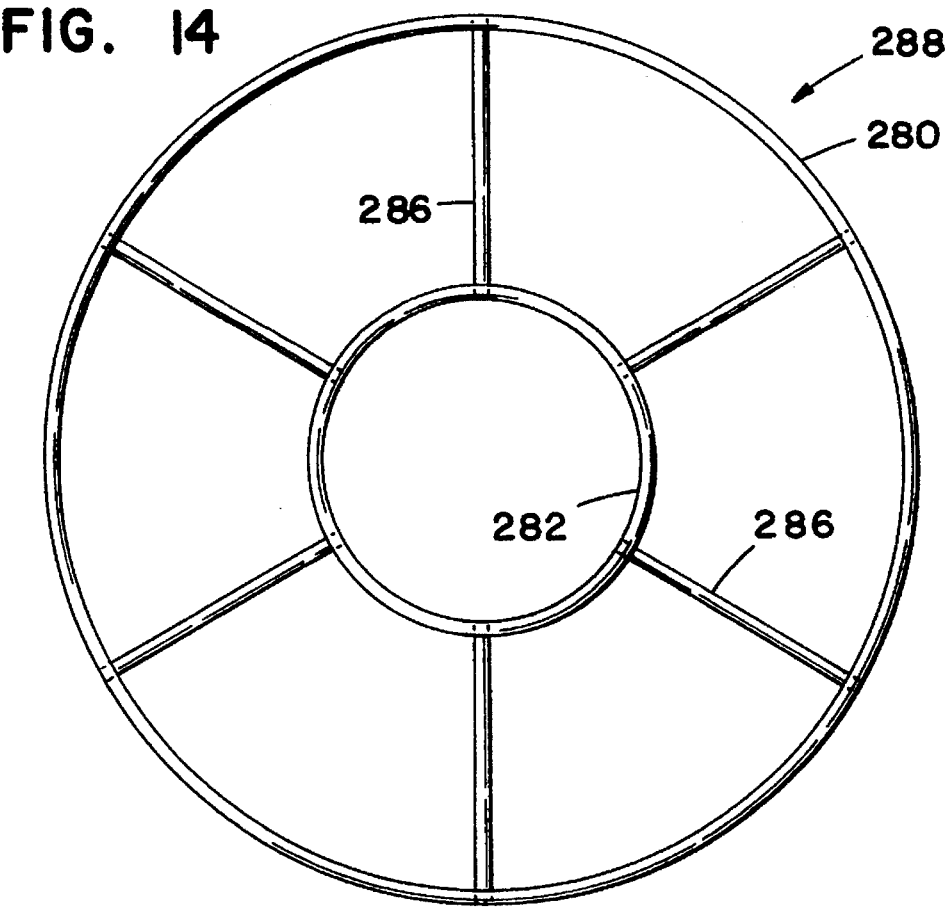
FIG. 14 is a top view of the frame of the 6-cup muffing cooking system.
Figure 15:
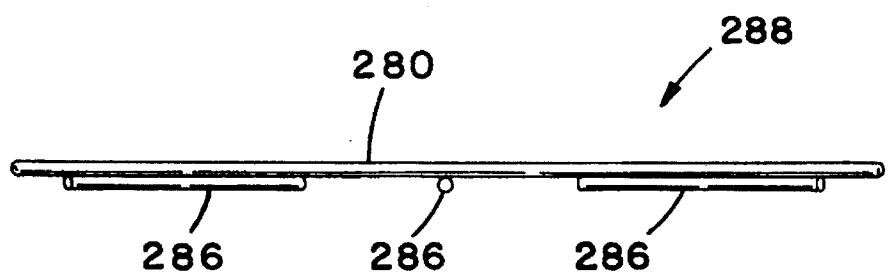
FIG. 15 is a sectional view of the 6-cup unit muffin cooking system.

There are a number of methods for attaching the cup units 272 to a frame for holding the cup units in position. One embodiment 270 as shown in FIG. 13 involves the use of six cup units 272 and a frame system 288. In addition, there are a number of frame configurations, holding more or less than six cup units. An embodiment having a frame holding twelve cup units is shown in FIG. 6.

FIG. 13 shows a frame having six cup units 272. The cup units 272 may be attached to the frame by clamping on by other means including welding. Clamping may be done by a number of different methods, the method proposed in this embodiment is by rolling a tab connected to the rim of the cup unit 272. The tab is rolled over the frame segments in at least two positions. In other embodiments, positions of tab rolling and frame connection may vary depending on the number of cups used and the number of annulus shafts used in the frame.

FIG. 13 shows the connection of cup units 272 to the outer annulus shaft 280 and the inner annulus shaft 282. Another embodiment allows the frame connectors 286 to continue until the meet at the center. The frame connection would be welded together to create a spoked system. The cup units 272 are connected to the outer annulus shaft 282 and the fame connectors 286.

Figure 6:
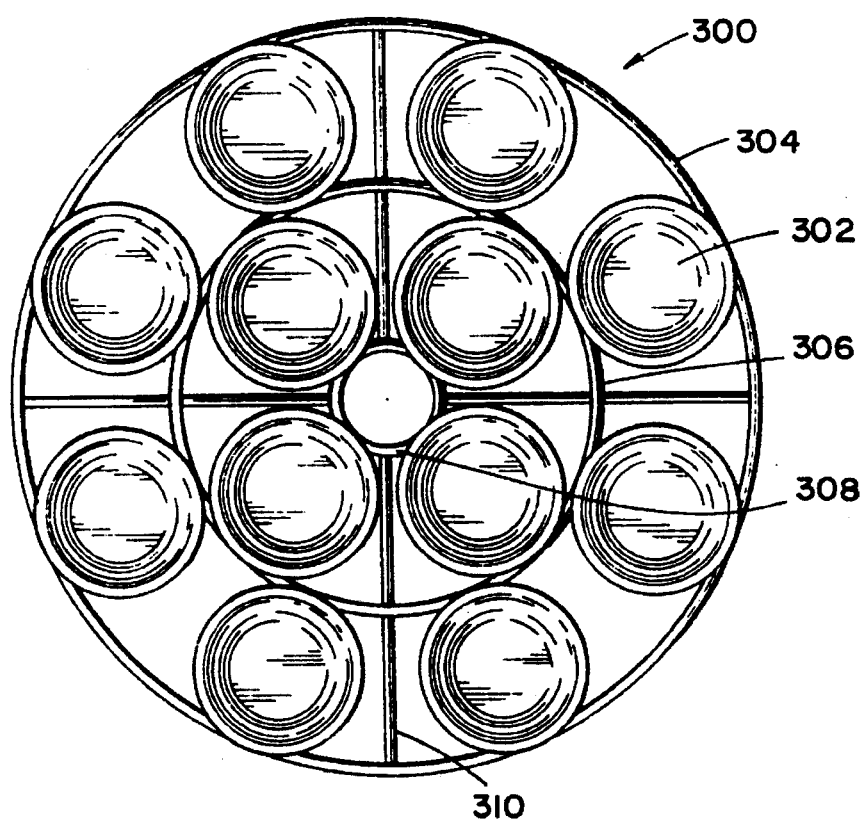
FIG. 6 is a top view of the 12-cup unit muffin cooking system.
Figure 7:
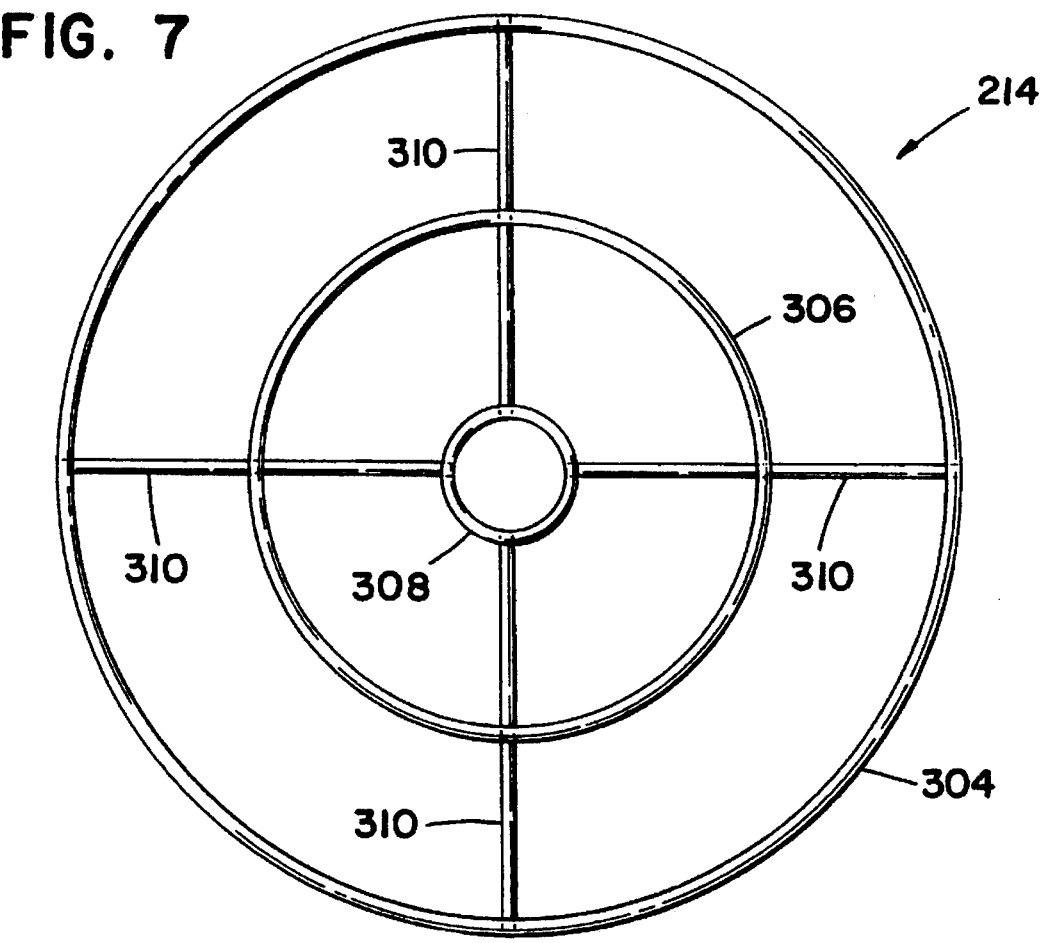
FIG. 7 is a top view of the frame for the 12-cup unit muffin cooking system.
Figure 8:
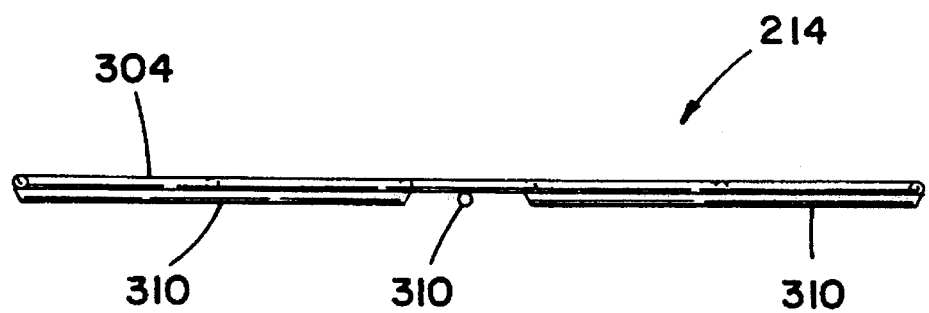
FIG. 8 is a sectional view of the frame of the 12-cup unit muffin cooking system.
Figure 9:
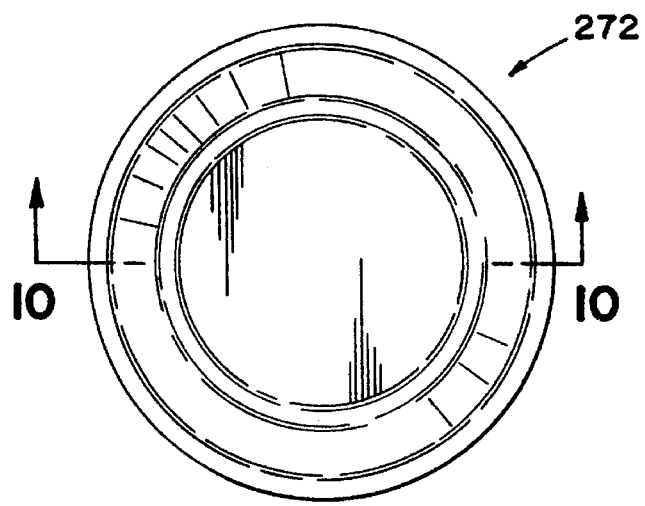
FIG. 9 is a top view of a muffin cup unit.

FIG. 6 illustrates an embodiment of the muffin baking system 300 having a twelve cup unit. The cup units 302 may be attached in at least two positions by welding the cup unit 302 peripheral rim to the frame system 214. In this embodiment there are 3 annulus shafts, outer 304, middle 306, and inner 308. The remainder of the frame system is comprised of four shafts 310, which may be welded to the annular members.

In either of the above mentioned embodiments of the muffin baking system, the cup units are positioned on the grill 29 inside of the air oven 10. Muffin baking system structure allows for cyclonic air to more freely circulate throughout the cooking chamber. Air can be drawn up through the muffin baking system as required to keep the air heated and circulating in its cyclonic pattern. This frame structure eliminates the problems associated with muffin pans lacking holes within its structure.

As with any device that cooks a variety of foods, cleanability is a major concern. As a result of the rapid air movement found in most convection ovens, food particles, oil and grease are distributed over most interior surfaces of the oven. When these particles contact the heater in a convection oven, the burn, causing smoke, odor and cleaning problems. With the disclosed air fryer, such problems are largely eliminated due to the easy cleanability of the cooking enclosure and the design of the heater and its positioning.

The open coil heater 78 in the disclosed air fryer is positioned directly above the blower wheel 43. The blower is fully open at the bottom, but also partially open on its top. As a result, the blower draws most of its make-up air into its bottom side, but also draws air into its top. This causes a portion of the air thrown out from the circumference of the blower to reverse direction and be drawn back through the heater perimeter, down through the open lower plate of the heater assembly and into the semi-open top of the blower wheel. This highly heated air is then mixed with the air being drawn in from the bottom of the blower. This mixture is then thrown out horizontally into the cooking chamber. This configuration provides the following advantages: most particles are unable to make the abrupt 180 degree change in direction that the air drawn through the heater does. Therefore, the air traveling through the heater assembly is virtually free of contamination, while most particles are thrown off to the sides and bottom of the cooking chamber, where thy can easily be cleaned away. As a result of the above, the heater does not accumulate food, oil or grease, thereby eliminating the need to clean the heater, extending heater element life and preventing smoke or fire hazard.

Positioning the heater immediately above the blower saves substantial space, and allows for the compact design of an easily-removed blower assembly. When the assembly is removed, the entire cooking enclosure can then be washed in a conventional household dishwasher. The compactness allowed by said heater position leaves more visibility through the top wall of the transparent cooking enclosure, providing the user with a maximum view of the cooking operation. Due to the blower wheel being located directly below the heater assembly, the blower wheel provides additional mechanical protection to the heater while further reducing the risk of electrical shock to the user.

Cleaning of any food preparation appliance is always a primary concern. The disclosed air fryer is designed to be easily disassembled, allowing the entire two piece cooking enclosure to be emersed in water for soaking or washing in a household dishwasher. The enclosure typically is molded of low-stick plastic capable of withstandying the maximum internal operating temperature of 400 degrees F. The blower assembly contains all electrical components and easily mounts in the top half of the cooking enclosure by snapping in place by way of metal clips or screwing into place, much like the lid on a jar. The blower assembly is dimensioned to fit easily inside the cooking enclosure for storage, thereby saving on scarce kitchen storage space and reducing shipping and packaging expense.

The upper assembly is hingedly mounted on a detachable support which connects to the underside of the cooking enclosure. The cooking enclosure is opened by lifting up on the handel section 72 of the unit and hinging the entire assembly rearward until it stops in a vertical position. When the assembly is tilted rearward, an internal switch shuts off all power to the motor and heater, thereby eliminating any danger of injury due to contact with the moving blower.

Due to the extensive use of plastics and the need to keep assembly temperatures comfortable to the touch, internal cooling of the assembly is critical. The motor must also be kept within safe operating temperature limits.

To achieve the above objectives, the blower unit 42 has been designed to draw cool, room temperature air in from directly above the hinge area. Drawing air from this point avoids taking in hot air rising off of the cooking enclosure. This cool air is pulled through the rectangular segment connecting the motor enclosure to the hinge. This "duct" may also house electronic components that are heat sensitive or require cooling, such as triacs. From here, the air is drawn over the motor, up through a secondary blower wheel 63 directly above the motor and then exhausted downward around the outside walls of a "cup" 44 which surrounds the motor 48. This exhaust air is finally forced through a gap 74 separating the cooking enclosure and the bottom edge of the blower assembly. Here the air serves a valuable function of cooling the cooking enclosure plastic at its most vulnerable point, close to the heater assembly.

Any deformation of the blower mount area due to over-temperature trouble would render the cooking enclosure useless. Gussets may be molded into the blower mount area to act as stiffeners and cooling fins for the plastic.

When the blower is removed from the cooking enclosure, the user may then install optional attachments to convert the air fryer into a steamer, a corn popper or other application that would fit the configuration and features of the cooking enclosure.

An important feature fitting the configuration that may be installed when the blower is removed is a steam and heat controlling handle. FIG. 1, illustrates an embodiment of the use of a steam and heat control handle, in conjunction with the frying oven, generally designated 100.

The steam control handle interacts in an opening in the upper member 12 of the cooking chamber. The steam control handle 100 includes a handle base portion 114 mounted on the upper wall 32 of the cooking chamber. The steam control handle 100 has a first riser portion 108 and a second movable riser portion 109. The handle portion 112 includes a transverse portion 110 that forms a grippable handle. The sliding portion 109 is opened so that steam entrapped in the cooking chamber may be released through an orifice 105.

Figure 10:
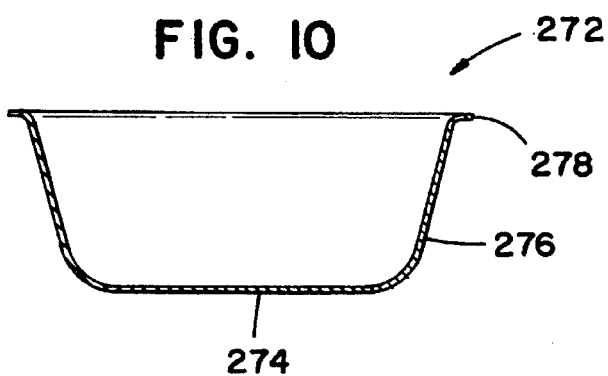
FIG. 10 is view taken along lines 10—10. if FIG. 9.
Figure 11:
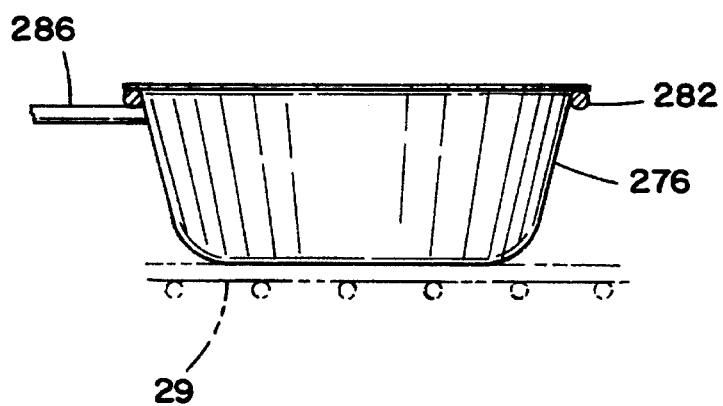
FIG. 11 is a sectional view of a muffin cup engaged with the frame of muffin cooking system showing the frame and the muffin cup unit engagement with cooking unit rack.
Figure 12:
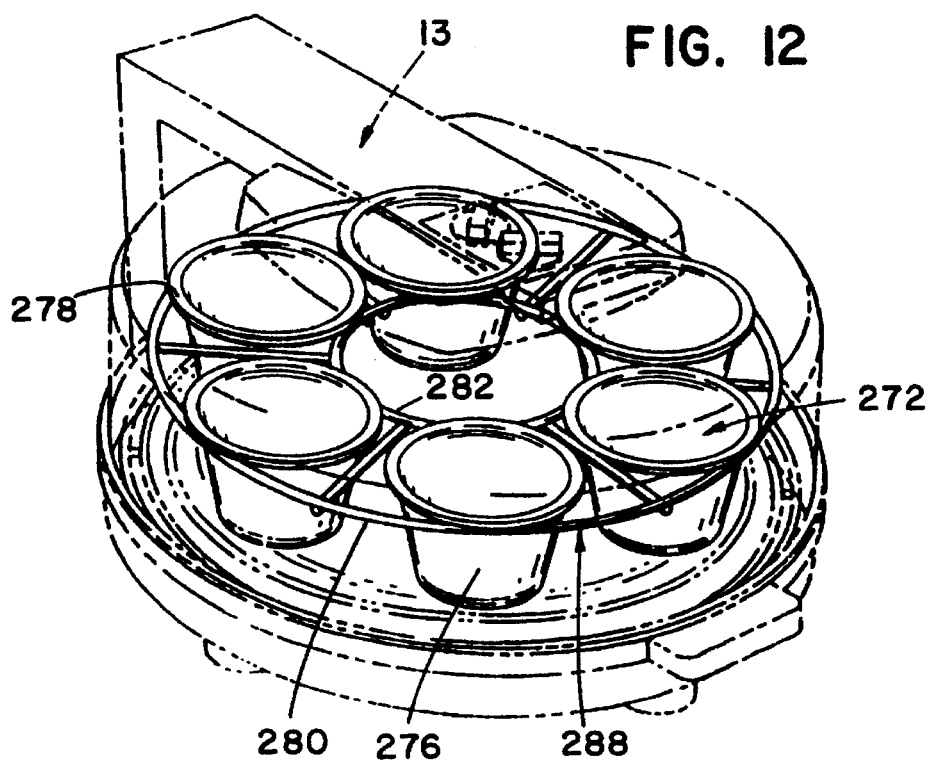
FIG. 12 is a prospective view of a 6-cup unit of the muffin cooking system.

The sliding portion 109 can be slid from first position wherein the sliding handle covers the aperture 105 to a second position as show in FIG. 10, wherein a space 106 is formed between the base portion 114 and the sliding portion of the handle 109. When the handle is so opened steam is allowed to escape from the cooking chamber out through orifices 105 and 106 into the atmosphere. When the sliding portion is moved so that the orifice 106 is covered, steam rises in the sliding portion 109 of the handle. A separation member 118 engages in upper portion 104 of the sliding handle 109 to prevent steam from entering the hollow chamber of the transverse portion 110 of the handle 100. In this manner, even with the sliding portion 109 in a closed position, steam will not enter the gripped portion 110 of the handle 100 so that the handle still may be held comfortably.

A ribbed portion 116 of the transverse handle 110 engages a raised end portion 117 of the sliding handle 109 to retain the handle in the closed or open position. FIG. 4 illustrates that there are three levels at which the handle may be retained. In addition, other embodiments may maintain more or less than three raised portions for retention of the handle.

As shown in FIG. 3, handle base portion 114 is preferably circular in shape and has a channel extending around the periphery of the lower surface thereof. This channel receives an upwardly-extending flange of the upper enclosure member 12 (FIG. 4). Handle base portion 114 has a plurality of bayonet fittings 128 which cooperate with the flange of the upper enclosure member so as to removably attach the handle to the upper enclosure member.

What is claimed is:
1. A food cooking and serving system, comprising:
   a. a countertop oven comprising a top enclosure and a bottom enclosure, the top enclosure defining a central opening;
   b. a heater and blower system removably located in the central opening defined by the top enclosure; and
   c. a handle adapted for replacing the heater and blower system when the heater and blower system is removed, the handle comprising:
      i. mounting means for removably attaching the handle to the top enclosure in order to replace the heater and blower system when the heater and blower system is removed; and
      ii. handle means for enabling a user to remove the top enclosure from the bottom enclosure by lifting up on the handle when the handle is installed in the top enclosure;
   d. whereby the countertop oven may be converted to a food server comprising the handle, the top enclosure, and the bottom enclosure.
2. The handle of claim 1 wherein:
   a. the handle comprises means for plugging the upper member central opening for the entrapment of steam and heat;
   b. the handle defines an opening; and
   c. the handle comprises vent means for controlling escape of steam and heat through the opening defined in the handle.
3. The system of claim 2 wherein vent means for controlling the escape of steam and heat includes a slidable cover wherein the slidable cover adjustably engages with the opening for adjustment of steam and heat escape levels.
4. The system of claim 3 wherein:
   a. the slidable cover controls the escape of steam and heat by varying the coverage of the slidable cover over the hole; and
   b. the slidable cover has at a plurality of predetermined positions.
5. The handle of claim 1 wherein:
   a. the handle is longer that it is wide, thereby having at least one end surface; and
   b. the opening defined by the handle is located in the at least one end surface;
   c. whereby steam and heat escaping from the handle opening is directed away from the hand of a user grasping the handle.
6. The system of claim 5 wherein the mounting means comprises a quick-release bayonet coupling for mounting the handle with the upper enclosure member central opening.
7. The system of claim 1 wherein the opening defined by the handle has an area of approximately 1.2 square inches.
8. A food cooking and serving system, comprising:
   a. countertop oven upper member and lower members, the members defining an enclosure having a circular horizontal cross section and an ovular vertical cross section, the lower member having disposed therein a rack for supporting food pieces to be cooked, the upper member defining therein a central upper opening;

b. heater and blower means, adapted to be removably disposed in the upper member central opening, for circulation of heated air, the heater and blower means comprising a quick-release bayonet screw mechanism for quickly mounting or removing the heater and blower means in the upper enclosure member central opening; and c. a removable handle adapted to be disposed in the upper member central opening, the handle comprising:
  i. means for plugging the upper member central opening for the entrapment of steam and heat; and
  ii. vent means for controlling the escape of the steam and heat through an opening defined by the handle, the vent means including a slidable cover which adjustably engages with the opening for adjustment of steam and heat escape levels, the slidable cover comprising means for controlling the escape of steam and heat by varying the coverage of the slidable cover over the opening, the slidable cover having a plurality of predetermined positions;
  iii. mounting means for removably attaching the handle to the top enclosure in order to replace the heater and blower system when the heater and blower system is removed, the mounting means comprising a quick-release bayonet screw mechanism for quickly mounting or removing the handle in the upper enclosure member central opening; and
  iv. handle means for enabling a user to remove the top enclosure from the bottom enclosure by lifting up on the handle when the handle is installed in the top enclosure;

d. whereby the countertop oven may be converted to a food server comprising the handle, the top enclosure, and the bottom enclosure.

9. A food cooking and serving system, comprising:

a. a countertop oven, the oven comprising the top enclosure and a bottom enclosure, the top enclosure having a central opening defined therein;

b. a heater and blower system removably located in the central opening of the top enclosure; and c. a handle for replacing the heater and blower system, said handle comprising:
  (1) a handle base portion having a lower surface and an upper surface, said handle base portion covering the central opening and having mounting means extending around a periphery of the lower surface thereof for removably attaching the handle to the top enclosure; and
  (2) a handle portion extending upwardly from said handle base portion, said handle portion enabling a user to remove the top enclosure from the bottom enclosure by lifting up on the handle when the handle is installed in the upper enclosure;

d. whereby the countertop oven may be converted to a food server comprising the handle, the top enclosure, and the bottom enclosure.

10. The system as claimed in claim 9, wherein said handle further comprises an opening formed in the handle and a variable vent for controlling escape of steam and heat through the opening formed in the handle.

11. The system as claimed in claim 10, wherein the vent comprises a slidable cover, and wherein the slidable cover is slidable so as to vary the coverage of the slidable cover over the opening formed in the handle so as to adjust steam and heat escape levels.

12. The system as claimed in claim 11, wherein the slidable cover has a plurality of predetermined positions.

13. The system as claimed in claim 10, wherein the opening defined by the handle has an area greater than approximately one square inch.

14. The system as claimed in claim 9, wherein the mounting means comprises a bayonet coupling for releasably mounting the handle to the upper enclosure.

15. The system as claimed in claim 9, wherein the top enclosure has a flange extending upwardly therefrom, and wherein the handle comprises a channel extending around the periphery of the lower surface of the handle base portion for receiving the flange.

16. The system as claimed in claim 9, wherein the handle portion comprises first and second riser portions and a transverse portion extending between the first and second riser portions.

17. The system as claimed in claim 16, wherein the handle base portion has an opening therein, and wherein the first riser portion has an opening therein which cooperates with the opening in the handle base portion and a vent for controlling escape of steam and heat through the openings formed in the handle base portion and the first riser portion.

18. The system as claimed in claim 17, wherein the vent comprises a slidable cover, and wherein the slidable cover is slidable so as to vary the coverage of the slidable cover over the opening formed in the handle base portion so as to adjust steam and heat escape levels.

19. The system as claimed in claim 18, wherein the slidable cover is slidable between a plurality of predetermined positions.

20. The system as claimed in claim 19, wherein said transverse portion has a ribbed portion and wherein the slidable cover has an arm which engages said ribbed portion so hold the slidable cover in one of said predetermined positions.

21. The system as claimed in claim 17, wherein the handle portion has a separation member which prevents steam from entering the transverse portion of the handle portion.

* * * * *

UNITED STATES PATENT AND TRADEMARK OFFICE
CERTIFICATE OF CORRECTION

PATENT NO. : 5,520,096

DATED : May 26, 1996

INVENTOR(S) : Dornbush et al.

It is certified that error appears in the above-identified patent and that said Letters Patent is hereby corrected as shown below:

```
Col. 2, line 26 "if" should read --of--

Col. 2, line 30 "prospective" should read --perspective--

Col. 2, line 35 "muffing" should read --muffin--

Col. 2, line 39 "prospective" should read --perspective--

Col. 2, line 54 delete "if" after the word "are"

Col. 2, line 55 delete "of" after the numeral "10"

Col. 5, line 14 delete "is" after the word "distance"

Col. 5, line 48 "the" should read --they--

Col. 6, line 8 "the" should read --they--

Col. 6, line 29 "thy" should read --they--

Col. 6, line 49 "emersed" should read --immersed--

Col. 6, line 51 "withstandying" should read --withstanding--
```

UNITED STATES PATENT AND TRADEMARK OFFICE
CERTIFICATE OF CORRECTION

PATENT NO. : 5,520,096

DATED : May 28, 1996

INVENTOR(S) : Dornbush et al.

It is certified that error appears in the above-identified patent and that said Letters Patent is hereby corrected as shown below:

Col. 6, line 63 "handel" should read --handle--

Col. 10, line 48 "so hold" should read --so as to hold--

Signed and Sealed this

Twenty-sixth Day of November 1996

Attest:

BRUCE LEHMAN

Attesting Officer

Commissioner of Patents and Trademarks